(12) United States Patent
Tillery et al.

(10) Patent No.: US 9,611,752 B2
(45) Date of Patent: Apr. 4, 2017

(54) COMPRESSOR START BLEED SYSTEM FOR A TURBINE SYSTEM AND METHOD OF CONTROLLING A COMPRESSOR START BLEED SYSTEM

(71) Applicant: General Electric Company, Schenectady, NY (US)

(72) Inventors: Steven William Tillery, Simpsonville, SC (US); David August Snider, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 927 days.

(21) Appl. No.: 13/836,225

(22) Filed: Mar. 15, 2013

(65) Prior Publication Data

US 2014/0271110 A1    Sep. 18, 2014

(51) Int. Cl.
*F02C 6/08* (2006.01)
*F01D 19/00* (2006.01)
*F02C 7/26* (2006.01)

(52) U.S. Cl.
CPC ............... *F01D 19/00* (2013.01); *F02C 6/08* (2013.01); *F02C 7/26* (2013.01); *F05D 2260/85* (2013.01)

(58) Field of Classification Search
CPC ...... F02C 3/13; F02C 6/08; F02C 9/18; F02C 9/52; F02C 9/28
USPC ......................................................... 60/782
See application file for complete search history.

(56) References Cited

U.S. PATENT DOCUMENTS

| | | |
|---|---|---|
| 2,938,338 A | 5/1960 | Creswick et al. |
| 3,646,753 A | 3/1972 | Colman et al. |
| 3,793,825 A | 2/1974 | Dickhart et al. |
| 3,793,905 A | 2/1974 | Black et al. |
| 3,844,112 A | 10/1974 | Harrison |
| 3,858,391 A | 1/1975 | Davis et al. |
| 4,186,556 A | 2/1980 | Lowry et al. |
| 4,251,985 A | 2/1981 | Sullivan |
| 4,332,133 A | 6/1982 | Schwarz et al. |
| 4,380,893 A | 4/1983 | Stokes et al. |
| 4,428,194 A | 1/1984 | Stokes et al. |
| 4,502,275 A | 3/1985 | Petro |
| 4,550,379 A | 10/1985 | Kawai et al. |
| 4,645,416 A | 2/1987 | Weiner |
| 4,894,782 A | 1/1990 | Alcock et al. |
| 5,022,224 A | 6/1991 | Smith |
| 5,063,733 A | 11/1991 | Jackson et al. |
| 5,201,180 A | 4/1993 | Girbig |
| 5,317,877 A | 6/1994 | Stuart |
| 5,362,219 A | 11/1994 | Paul et al. |
| 5,498,126 A | 3/1996 | Pighetti et al. |
| 6,027,304 A | 2/2000 | Arar et al. |
| 6,086,326 A | 7/2000 | Honda et al. |

(Continued)

*Primary Examiner* — Jason Shanske
(74) *Attorney, Agent, or Firm* — John P. Darling

(57) ABSTRACT

A compressor start bleed system for a turbine system includes a compressor section. Also included is a turbine section disposed downstream of the compressor section. Further included is at least one duct fluidly coupled to the compressor section, wherein the at least one duct is configured to route a start bleed extraction from the compressor section to a location downstream of the turbine section. Yet further included is at least one control device of the at least one duct configured to actively modulate the start bleed extraction during a part speed operation of the turbine system.

5 Claims, 3 Drawing Sheets

(56) References Cited

U.S. PATENT DOCUMENTS

| | | | |
|---|---|---|---|
| 6,279,310 B1 | 8/2001 | Strand et al. |
| 6,321,526 B1 | 11/2001 | Hamana |
| 6,328,526 B1 | 12/2001 | Seki et al. |
| D505,430 S | 5/2005 | Buck |
| 7,000,405 B2 | 2/2006 | McKelvey et al. |
| 7,051,534 B2 | 5/2006 | Sandberg et al. |
| 7,293,953 B2 | 11/2007 | Leach et al. |
| 7,328,623 B2 | 2/2008 | Slagle et al. |
| 7,617,687 B2 | 11/2009 | West et al. |
| 7,784,288 B2 | 8/2010 | Thatcher et al. |
| 8,105,012 B2 | 1/2012 | Anema |
| 2002/0108376 A1 | 8/2002 | Stevens |
| 2004/0016238 A1 | 1/2004 | Eleftheriou et al. |
| 2004/0191058 A1 | 9/2004 | Baumann |
| 2005/0008476 A1 | 1/2005 | Eleftheriou |
| 2006/0039782 A1 | 2/2006 | Martin et al. |
| 2007/0204625 A1 | 9/2007 | Thatcher et al. |
| 2008/0041713 A1 | 2/2008 | Ewert et al. |
| 2009/0117840 A1 | 5/2009 | Kresser et al. |
| 2010/0215480 A1 | 8/2010 | Leach et al. |
| 2010/0232945 A1 | 9/2010 | Zhang et al. |
| 2010/0242491 A1 | 9/2010 | Davis, Jr. et al. |
| 2010/0247285 A1 | 9/2010 | Hanahan |
| 2010/0251727 A1 | 10/2010 | Myers et al. |
| 2010/0286889 A1 | 11/2010 | Childers |
| 2010/0293961 A1 | 11/2010 | Tong et al. |
| 2011/0094241 A1 | 4/2011 | Rodd et al. |
| 2011/0185745 A1 | 8/2011 | Eccles et al. |
| 2011/0289934 A1 | 12/2011 | Desabhatla |
| 2012/0180509 A1* | 7/2012 | DeFrancesco ......... B64D 13/08 62/172 |
| 2012/0186267 A1 | 7/2012 | Coffinberry et al. |
| 2012/0312027 A1* | 12/2012 | Savarin ................. F02C 6/08 60/785 |
| 2013/0125557 A1* | 5/2013 | Scipio ..................... F02C 9/22 60/773 |

* cited by examiner

COMPRESSOR START BLEED SYSTEM FOR A TURBINE SYSTEM AND METHOD OF CONTROLLING A COMPRESSOR START BLEED SYSTEM

BACKGROUND OF THE INVENTION

The subject matter disclosed herein relates to turbine systems, and more particularly to a compressor start bleed system, as well as a method of controlling the compressor start bleed system.

At low speeds, an axial compressor tends to load the front end of the compressor, while the back end is very lightly loaded. This characteristic can result in an inoperable condition with the front of the compressor in a surge condition, which can result in mechanical stress, loss of air flow and the failure of the turbine system to start. To address this characteristic, a start bleed system is employed. The start bleed system extracts flow from one or more compressor stages, which unloads the front of the compressor and moves it away from the surge boundary. This will also increase the loading on the back of the compressor, but given the light loading, there is typically margin to increase the loading without risking surge. Start bleed systems typically employ an on/off control, and the target flow is selected to balance the operation of the various regions of the compressor. Depending on the location of the start bleeds within the compressor, and the characteristics of the compressor, the start bleed extraction from the compressor may decrease, or increase the compressor discharge flow to the rest of the gas turbine system.

In addition to the compressor limitations, there are also limitations on combustor operability which tend to require a limited range of fuel flow relative to air flow, and other system limitations such as exhaust temperature, turbine acceleration, etc. The typical gas turbine design sets a start bleed flow, and then based on the compressor performance with start bleeds on, a control strategy is developed to meet the system boundaries. The current turbine systems tend to target higher performance, and the resulting operable space for the system is becoming smaller. Therefore, it is becoming increasingly more challenging to meet all the system requirements with the typical system design.

BRIEF DESCRIPTION OF THE INVENTION

According to one aspect of the invention, a compressor start bleed system for a turbine system includes a compressor section. Also included is a turbine section disposed downstream of the compressor section. Further included is at least one duct fluidly coupled to the compressor section, wherein the at least one duct is configured to route a start bleed extraction from the compressor section to a location downstream of the turbine section. Yet further included is at least one control device of the at least one duct configured to actively modulate the start bleed extraction during a part speed operation of the turbine system.

According to another aspect of the invention, a method of controlling a compressor start bleed system during part speed operation of a turbine system is provided. The method includes monitoring at least one operating parameter of the turbine system. The method also includes comparing the at least one operating parameter to a system requirement. The method further includes routing a start bleed extraction through at least one duct from the compressor section to a location downstream of a turbine section. The method yet further includes modulating the start bleed extraction with at least one control device of the at least one duct at least partially in response to the comparison between the at least one operating parameter and the system requirement.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
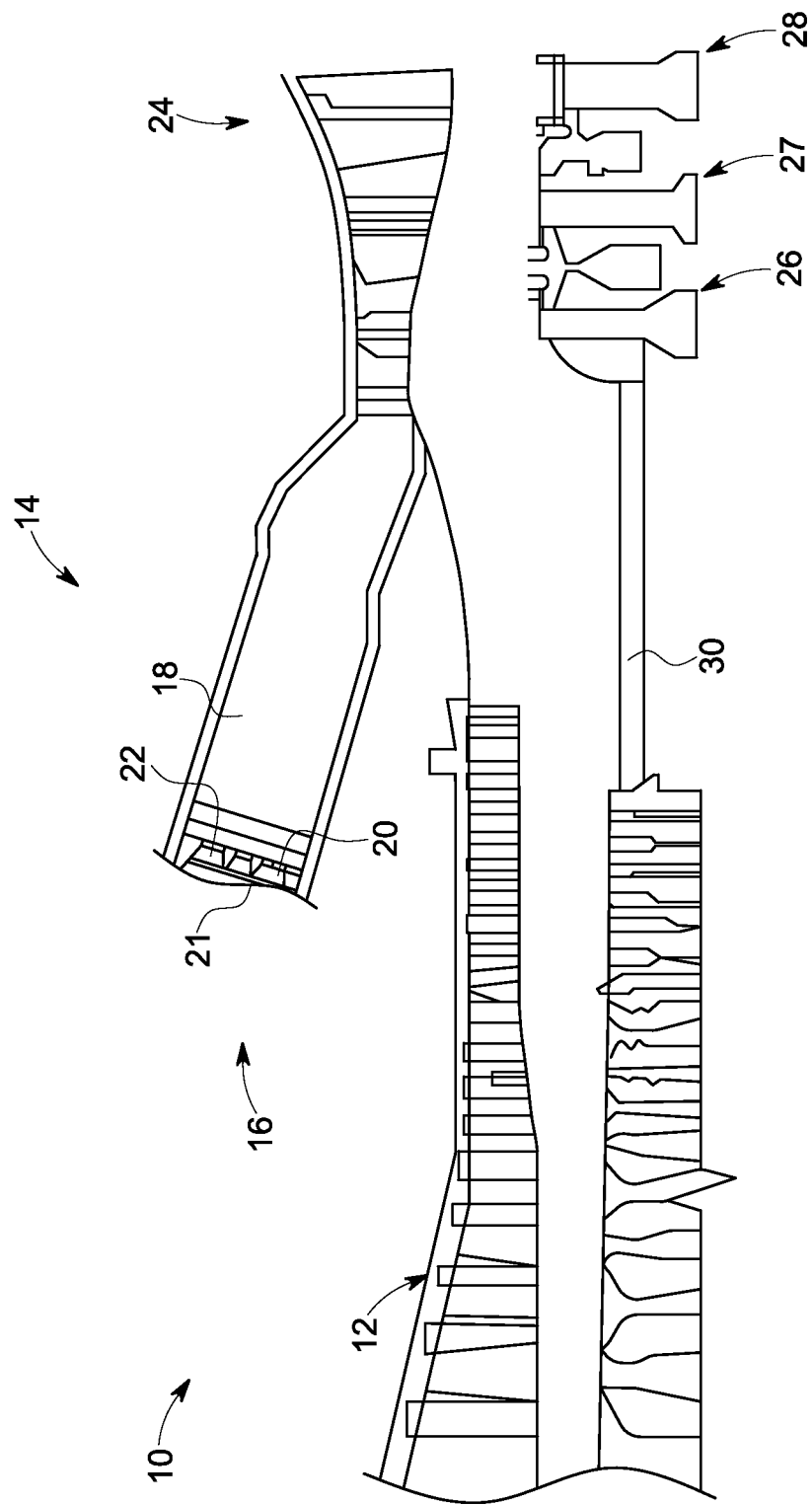
FIG. 1 is schematic illustration of a turbine system.

Referring to FIG. 1, a turbine system, such as a gas turbine engine 10 constructed in accordance with an exemplary embodiment of the present invention, is schematically illustrated. The gas turbine engine 10 includes a compressor section 12 and a plurality of combustor assemblies arranged in a can annular array, one of which is indicated at 14. As shown, the combustor 14 includes an endcover assembly 16 that seals, and at least partially defines, a combustion section 18. In one embodiment, a plurality of nozzles 20-22 is supported by the endcover assembly 16 and extends into the combustion section 18. The nozzles 20-22 receive fuel through a common fuel inlet (not shown) and compressed air from the compressor section 12. It should be appreciated that this invention is independent of the details of the combustion system, and the can annular system is referenced for purposes of discussion. The fuel and compressed air are passed into the combustion section 18 and ignited to form a high temperature, high pressure combustion product or air stream that is used to drive a turbine section 24. The turbine section 24 includes a plurality of stages 26-28 that are operationally connected to the compressor section 12 through a compressor/turbine shaft 30 (also referred to as a rotor).

In operation, air flows into the compressor section 12 and is compressed into a high pressure gas. The high pressure gas is supplied to the combustor 14 and mixed with fuel, for example natural gas, fuel oil, process gas and/or synthetic gas (syngas), in the combustion section 18. The fuel-air or combustible mixture ignites to form a high pressure, high temperature combustion gas stream. In any event, the combustor 14 channels the combustion gas stream to the turbine section 24 which converts thermal energy to mechanical, rotational energy.

Figure 2:
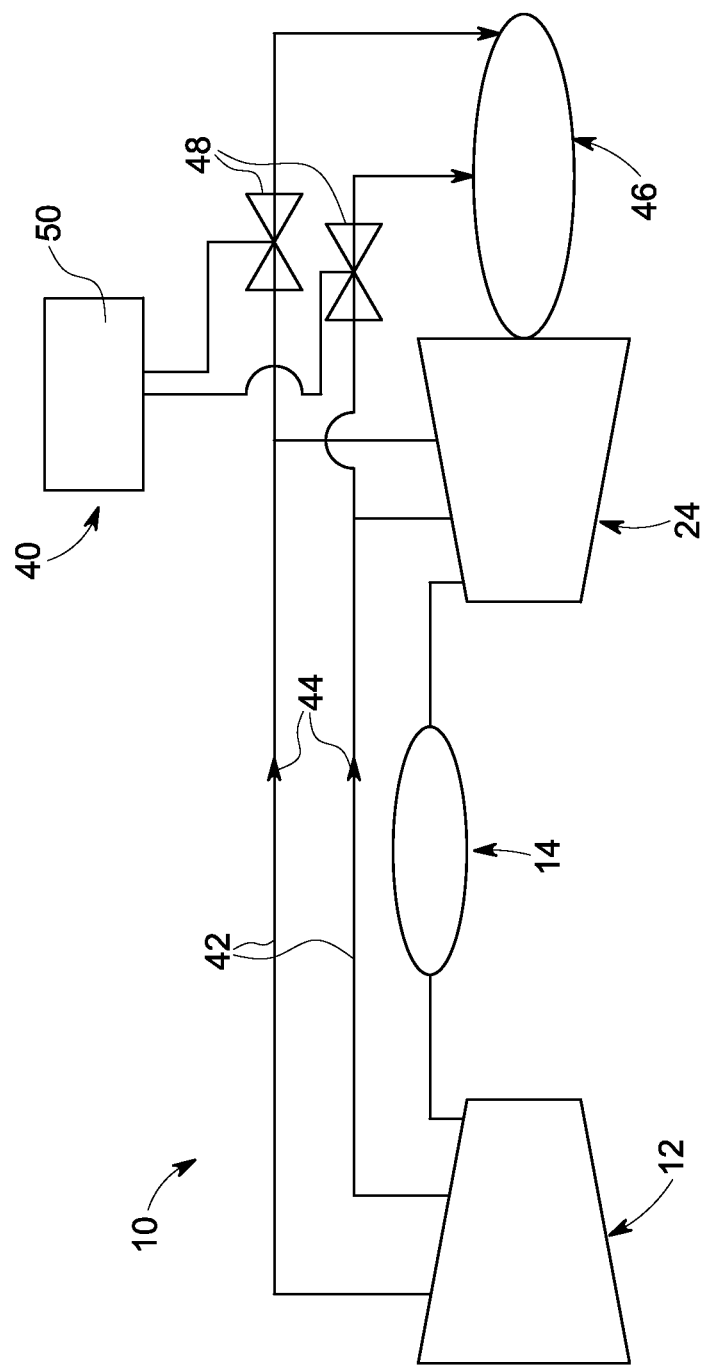
FIG. 2 is a schematic illustration of a compressor start bleed system in communication with the turbine system.

Referring to FIG. 2, the gas turbine engine 10 is shown with a compressor start bleed system 40 in operative communication therewith. The compressor start bleed system 40 includes at least one duct 42 disposed in flow communication, or fluidly coupled, with an extraction point or stage of the compressor section 12 for bleeding a portion of the compressed air as bleed air at a corresponding extraction pressure. The portion of extracted air is referred to herein as a start bleed extraction 44. The start bleed extraction 44 is bled to a location downstream of the turbine section 24, such as a turbine exhaust diffuser 46 or the atmosphere. As shown, a plurality of ducts may be included to provide a plurality of start bleed extraction paths, however, a single duct is described in detail below. The term start bleed extraction refers to an extraction system employed to improve compressor operability during speeds ranging between at rest to operating speed and is distinct from turbine system cooling.

The flow rate of the start bleed extraction 44 is controlled during a part speed operation or other transient and steady state operation of the gas turbine engine 10, and more particularly during a start-up and/or shutdown operating range of the compressor section 12, in order to manage protection of the compressor section 12 and to manage turbine inlet airflow or compressor exit airflow. Part speed operation refers to a ramping up or down of gas turbine speed, which is defined as a speed below a percentage of full speed. More particularly, part speed refers to an entire range of acceleration and deceleration modes below full speed, such as acceleration from rest to operating speed and deceleration from operating speed to rest. To allow for control of the start bleed extraction 44 during part speed operation, the at least one duct 42 includes at least one control device 48 comprising one or more components that facilitate increasing and decreasing the cross-sectional area of the at least one duct 42 proximate the at least one control device 48, thereby facilitating control of the flow rate of the start bleed extraction 44 within the at least one duct 42.

In an exemplary embodiment, the at least one control device 48 may be comprised of a variable orifice portion comprising one or more variable geometry orifices or a control valve, either of which modulates the flow of extracted air. The geometry of each orifice may be controlled in accordance with one or more operating parameters or characteristics of the gas turbine engine 10 (as described in detail below) in order to control the start bleed extraction 44 to protect the compressor section 12 and safely operate the gas turbine engine 10. The at least one control device 48 may be disposed partially or fully within the at least one duct 42 and located in at least one stage of the compressor section 12 or located elsewhere in the gas turbine engine 10 at an external location relative to the compressor section 12.

The at least one control device 48 may be controlled by a control unit 50. The at least one control device 48 may comprise a variable valve (e.g., a hydraulic globe valve, pneumatic valve, gate valve, etc.), where the stroke of the variable valve may be controlled by the control unit 50 in accordance with one or more operating parameters of the gas turbine engine 10. The control unit 50 may perform many functions including fuel, air and emissions control, sequencing of turbine fuel and auxiliary for start-up, shut-down and cool-down, synchronization and voltage matching of generator and system, monitoring of all turbine, control and auxiliary functions, and protection against unsafe and adverse operating parameters. In one embodiment, the control unit 50 operates for controlling the at least one control device 48 during engine start-up and may be incorporated into existing control logic. In an exemplary embodiment, the control unit 50 for a gas turbine engine 10 may be a component and/or module incorporated into existing turbine control systems such as, but not limited to, the General Electric Co.'s Speedtronic™ Mark VI Control System.

The control unit 50 provides active modulation of the start bleed extraction 44 during part speed operation by controlling the at least one control device 48 of the at least one duct 42 in order to maintain desired operating parameters and/or conditions. The control unit 50 is capable of controlling the start bleed extraction 44 in response to one or more measured or calculated operating parameters of various components of the gas turbine engine 10. In accordance with an exemplary embodiment, one or more operating parameters of the gas turbine engine 10 utilized by the control unit 50 may be monitored by the control unit 50 with suitable sensors disposed in one or more locations in the gas turbine engine 10 measuring one or more operating parameters. The sensors may be placed throughout various components and/or stages of the gas turbine engine 10 including the compressor section 12, combustor 14, turbine section 24, the exhaust diffuser 46, and the at least one duct 42, etc.

The sensors disposed in one or more location in the gas turbine engine 10 may be used to monitor, measure, calculate, or otherwise obtain operating parameter data. The sensors in the turbine system may be used in open and/or closed loop control systems and to obtain operating data for monitoring operating parameters to allow the control unit 50 to modulate compressor extraction flows to maintain suitable fuel-air ratios to meet desired combustor operations and/or maintain desired operating conditions of the compressor section 12 during start-up operation, such as a compressor operating limit line. Such operating parameters may include exhaust temperature and/or pressure, compressor airflow, compressor inlet and/or outlet temperatures and pressures, fuel flow, carbon monoxide, combustion dynamics, distribution and intake air-flow, etc.

In one embodiment, the control unit 50 comprises predetermined open and closed loop control schedules for startup and shutdown that correspond to various operating parameters, such as rotor speed, compressor inlet temperature, exhaust temperature, etc. The control is developed to meet all of the system requirements of the gas turbine engine 10. The predetermined control schedules may include, but are not limited to, the operating parameters noted above. Additionally, the control schedules may be predetermined or may be related to on-board modeling or other control strategies that actively manage the control schedule and operating boundaries for various components of the gas turbine engine 10.

In operation, the compressor section 12 increases in speed during start-up operation (or decreased during shut-down operation). In other words, the compressor section comprises a first speed and a second speed that is greater than the first compressor speed. Existing systems use a fixed flow area. The resulting extraction varies over the speed range based on the compressor characteristics. The flow area is set so that the compressor requirements are met at a critical point in the speed range, while most other speed ranges have excess levels of extraction. The embodiments described herein allow for modulation of the flow area to reduce the excess extraction which can assist in meeting other system boundaries. Therefore, the control unit 50 modulates the start bleed extraction 44 as a function of start-up operating parameters, potentially including, but not limited to, compressor speed. In this way, a more precise control of the extracted air is accomplished, as opposed to a simple fully open-closed configuration, thereby increasing the capability of the control to meet all system boundaries over the entire range of start-up conditions. It is to be understood that as start bleed extractions located forward in the compressor are increased, the airflow to the combustor may increase. This characteristic enables a modulated start bleed system to effectively operate to meet all system requirements.

In the fully open position of the at least one control device 48, an amount of air bypasses the combustor 14 to reduce compressor pressure ratio and reduce the amount of fuel required to hit the target fuel-air ratio. As the at least one control device 48 is gradually closed, the flow rate of the main airflow passing through the compressor section 12 and on to the combustor 14 is increased to maintain a target system torque requirement. However, in certain situations, increasing compressor extractions results in increased compressor exit flow. This is the result of unloading the front of the compressor, and the pressure ratio flow characteristics of the portion of the compressor.

Figure 3:
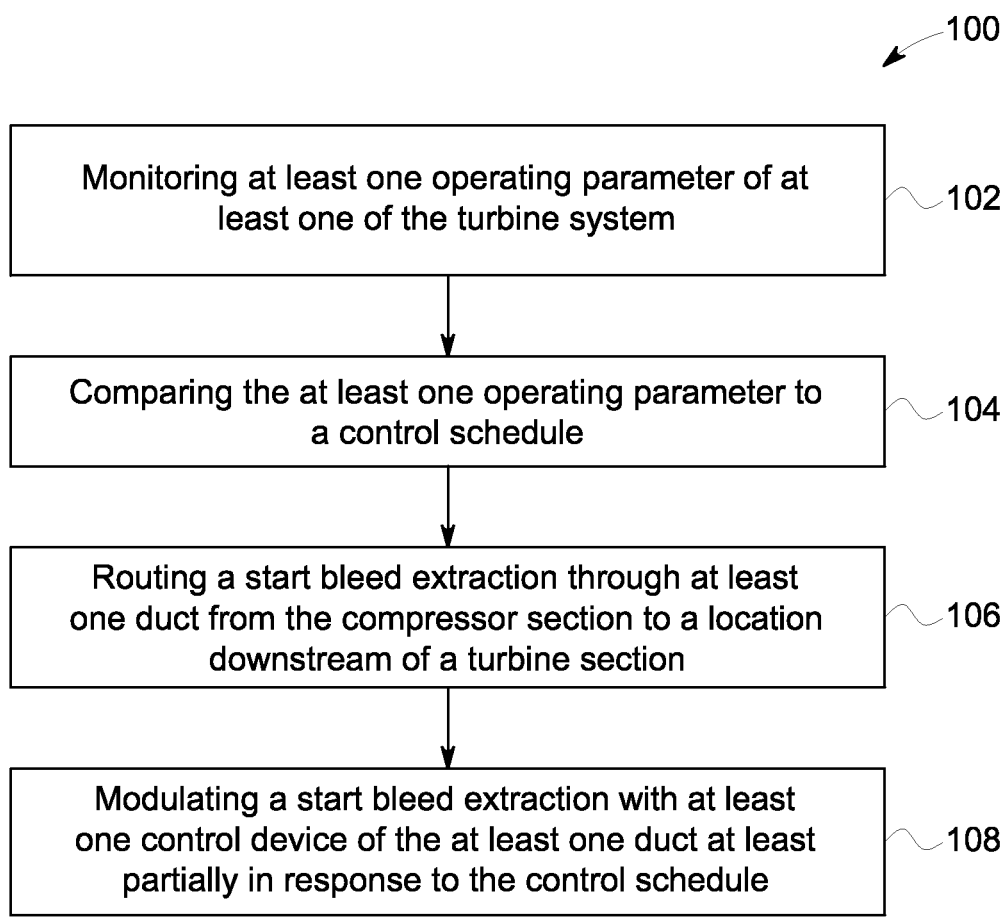
FIG. 3 is a flow diagram illustrating a method of controlling a compressor start bleed system.

Referring to the flow diagram of FIG. 3, in conjunction with FIGS. 1 and 2, a method of controlling a compressor start bleed system during part speed operation of a turbine system 100 is provided. The gas turbine engine 10, and more specifically the compressor start bleed system 40 have been previously described and specific structural components need not be described in further detail. The method of controlling a compressor start bleed system during part speed operation of a turbine system 100 includes monitoring at least one operating parameter of at least one of a compressor section and a combustor section 102. The operating parameter may also refer to other components, such as the turbine section 24, valve constraints, etc. The at least one operating parameter is compared to a control schedule 104 or design and/or operation limits for the gas turbine engine 10. A start bleed extraction is routed through at least one duct from the compressor section to a location downstream of a turbine section 106. The start bleed extraction is modulated with at least one control device of the at least one duct in response to the control schedule 108

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling a compressor start bleed extraction during start-up operation of a turbine system having a compressor section, a turbine section and a combustor section, comprising:
monitoring at least one operating parameter of the turbine system;
comparing the at least one operating parameter to a control schedule;
routing a start bleed extraction through at least one duct from the compressor section to a location downstream of the turbine section; and:
modulating the start bleed extraction through the at least one duct with at least one control device at least partially in response to the control schedule, wherein comparing the at least one operating parameter comprises comparing a compressor speed to a compressor operating limit line.

2. The method of claim 1, wherein monitoring the at least one operating parameter comprises monitoring a fuel-air ratio of the combustor section.

3. The method of claim 1, further comprising extracting the start bleed extraction from a plurality of stages of the compressor section for routing to a turbine exhaust section.

4. The method of claim 1, wherein routing the start bleed extraction comprises decreasing a flow rate of the start bleed extraction as a compressor speed is increased during a start-up operating range of the compressor section.

5. The method of claim 1, wherein modulating the start bleed extraction with the at least one control device comprises actively modifying a cross-sectional area of the at least one control device.

\* \* \* \* \*